K. E. NERÉN.
REGULATING DEVICE FOR WIND MOTORS.
APPLICATION FILED DEC. 1, 1908.
983,163.
Patented Jan. 31, 1911.
2 SHEETS—SHEET 1.
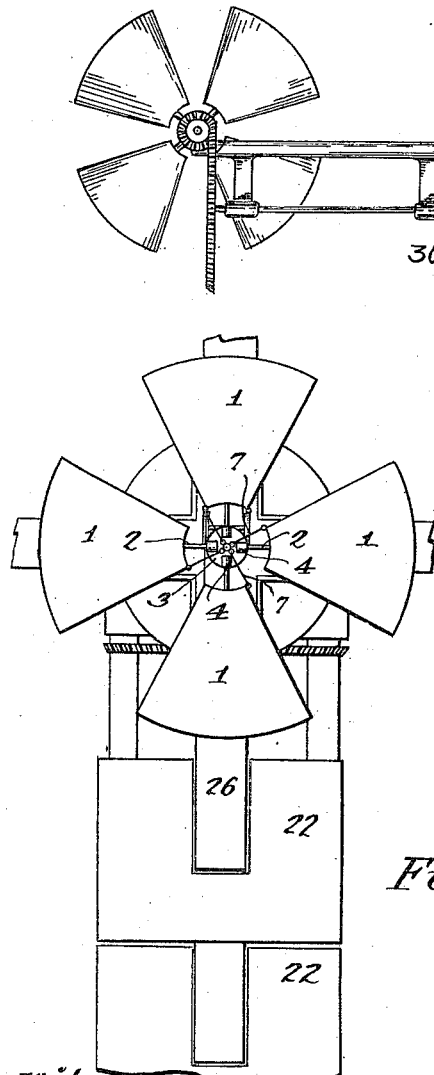
Fig. 1.
Fig. 2.
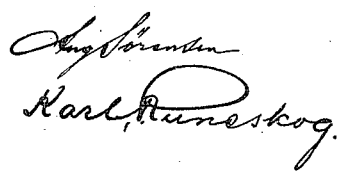
Witnesses
Inventor
Karl Edwin Nerén K. E. NERÉN.
REGULATING DEVICE FOR WIND MOTORS.
APPLICATION FILED DEC. 1, 1908.
983,163.
Patented Jan. 31, 1911.
2 SHEETS—SHEET 2.
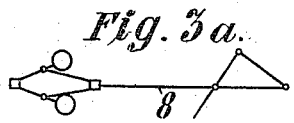
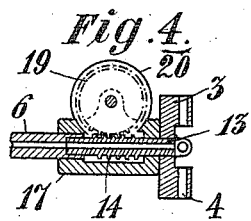
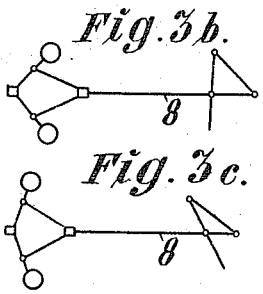
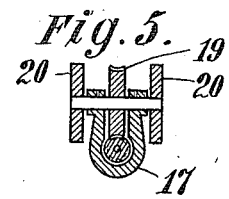
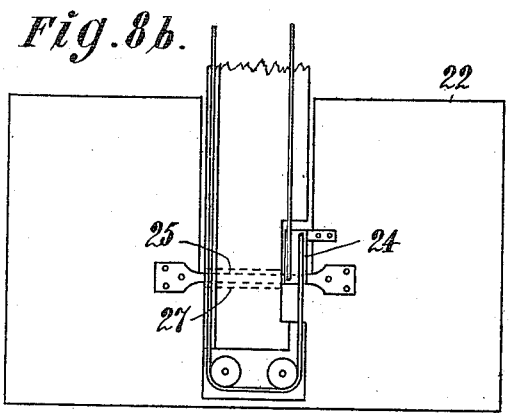
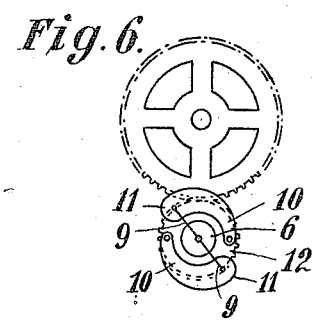
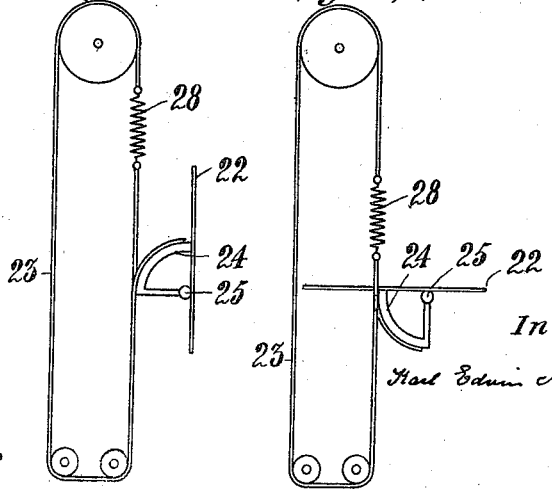
Witnesses
Inventor
Karl Edwin Nerén

UNITED STATES PATENT OFFICE.

KARL EDVIN NERÉN, OF STOCKHOLM, SWEDEN.

REGULATING DEVICE FOR WIND-MOTORS.

983,163. Specification of Letters Patent. Patented Jan. 31, 1911.

Application filed December 1, 1908. Serial No. 465,487.

*To all whom it may concern:*

Be it known that I, KARL EDVIN NERÉN, a subject of the King of Sweden, residing at Stockholm, in the Kingdom of Sweden, have invented new and useful Improvements in Regulating Devices for Wind-Motors, of which the following is a specification, reference being had to the drawings accompanying and forming a part hereof.

This invention relates to regulating devices for wind motors for obtaining a constant speed even when the force of wind, or the load on the motor, respectively, is changed, provided the load does not exceed the maximum effect which the wind motor can develop at the prevailing wind speed.

Wind motors have been used long ago, especially in farming for driving pumps, threshing-mills and other machines, and inasmuch as they have lately been employed for driving electric generators in so-called wind electric works, the need of such a motor running with an approximately constant speed has made itself more and more felt. Several attempts have been made to construct such a wind motor but so far as I am aware they have all failed, more or less. Only when the motor worked with a constant load at a certain minimum wind speed (usually 9 yards in the second, or more) a favorable result was gained, but as soon as the load increased or decreased, the speed of the motor immediately changed. This is due to the deflective regulating devices used in prior motors of this kind in which only the pressure on the wheel, *i. e.* the effect of the motor has been regulated. In most cases these regulating devices are based on the principle that the wind-wheel is turned, according to the force of wind, into planes forming a greater or less angle to the direction of the wind. Obviously, by this means the regulation is not dependent on the speed of the motor. The regulation has also been performed by centrifugal governors driven directly from the wind-wheel, but inasmuch as the wind-wheel has a great inertia, it is obvious that the governing will be very insusceptible so that even in this case the regulation may scarcely be said to be dependent on the speed of the wind-wheel.

The object of the invention is to provide a regulating device for wind motors which is dependent on the speed of the motor.

The invention consists, chiefly, in the combination with the wind motor, of a centrifugal or other suitable speed governor, and an auxiliary or controlling wind-wheel having adjustable blades, said controlling wind-wheel, which is suitably placed in front of the motor wheel, having its blades connected at one side to the speed governor and at the other side to the adjustable blades of the motor wheel so as to be able to adjust the latter at the proper angle to the direction of the wind, corresponding to the angle of turning of the controlling wind-wheel in one or the other direction due to the adjustment of the blades of the said latter wheel caused by the speed governor.

The invention further comprises the construction and combination of parts hereinafter more particularly described.

In the drawings, I have shown a wind motor whose speed is regulated by a controlling wind-wheel according to the invention.

Figure 1 is a fragmentary side elevation of the wind motor partly in section through the axis of the shafts. Fig. 2 is a fragmentary front view thereof showing the controlling wind-wheel and one of the vanes of the wind motor. Figs. $3^a$, $3^b$ and $3^c$ are diagrams indicating the positions of the blades of the controlling wind-wheel at different speeds of the motor. Fig. 4 is a partly sectional detail view showing, on a larger scale, a longitudinal section of the gearing from the controlling wind-wheel. Fig. 5 is a partly sectional front view of the said gearing. Fig. 6 is a front view of a centrifugal governor acting on the blades of the controlling wind-wheel. Figs. $7^a$ and $7^b$ are diagrams showing the blades of the motor wind-wheel in two extreme positions. Figs. $8^a$ and $8^b$ are detail views of parts of the motor wind-wheel showing the blade-carrying arcs in two positions at right angles to each other.

Referring to the drawings, 1, 1 are the blades or vanes of the small auxiliary or controlling wind-wheel placed in front of the motor wind-wheel. These blades or vanes are suitably attached to axles 2 journaled in bearings 4 on a disk 3. The blades or vanes are connected by suitable links 7 to a spring-actuated rod 8 extending through the hollow motor shaft 6. The rod 8 is connected by wire-ropes or lines 9 to a centrifugal governor, suitably consisting of two eccentrically journaled weights 11 attached to a cog-wheel 12 which is rotated by suitable gearing from the motor shaft. During the running of the motor the centrifugal governor exerts a pull on the rod 8 against the action of the spring 21.

The disk 3 is attached to a spindle 13 (Fig. 4) journaled in the motor shaft 6 and in a box 15 attached to the said shaft, said spindle having a threaded part 14 serving as an endless screw or worm. The box 15 is provided with bearings 17 for an axle 18 having a worm-wheel 19 engaging the worm and pulleys 20 attached to the said axle. The movement of the pulleys is transmitted through wires or lines 23 to a series of arcs 24 having pivot pins 25 carried in bearings 27 in the frame of the motor wind-wheel. Attached to the arcs 24 are the blades or vanes 22 of the said wheel. Placed in the series of lines is a spring 28 acting as a safety valve to allow the wind surface of the wheel to open when the air-pressure thereon rises above a certain predetermined height. In order to enable the blades of the auxiliary or controlling wind-wheel to be adjusted by hand, when desired, a line or chain 29 extends from the governor down to the ground.

The regulating device described works in the following manner. At a low speed of the motor shaft 6 the centrifugal governor is unable to compress the spring 21, and, on account thereof, the blades of the small auxiliary or controlling wind-wheel in such case take up the position shown in Fig. 3ª. The controlling wind-wheel thereby rotates in the direction of the arrow (Fig. 3ª). If the speed increases to the normal one, the governor compresses the spring as shown in Fig. 3ᵇ, where the blades of the controlling wind-wheel are in a position at right angles to the direction of the wind. In this case the wind does not exert any torque on the controlling wind-wheel which will thus be at rest. If the speed of the motor exceeds the normal one, the spring 21 is further compressed and the blades of the controlling wind-wheel are caused to take up the position shown in Fig. 3ᶜ. The direction of rotation of the controlling wind-wheel is now opposite to that in the former case, as indicated by the arrow. The movement of the controlling wind-wheel is transmitted through the worm 14 and worm-wheel 19 to the pulleys 20. The movement of the pulleys is transmitted through the lines 23 to the arcs 24 and, thereby, to the blades or vanes 22. When the controlling wind-wheel rotates according to Fig. 3ª, i. e. when the speed is too low, the blades of the motor wind-wheel are turned toward the position at right angles to the wind (Fig. 7ª). If, on the contrary, the direction of rotation of the controlling wind-wheel is the opposite (according to Fig. 3ᶜ), i. e. the speed is too high, the blades of the motor wind-wheel are turned toward the position parallel to the direction of the wind (Fig. 7ᵇ). The same result as with the centrifugal governor may be obtained by a pull by hand in the line or chain 29, the latter device being suitably employed for stopping the motor.

In order to obtain the highest possible effect the arcs 24 and lines 23 are sunk into the frame 26, at the lee side thereof, by which the resistance to the wind is reduced to a fraction of that occurring in usual wind motors.

In order to bring the motor wheel up properly to the wind and to turn it to the proper position, when the wind changes, the motor is provided with a small wind-wheel (shown at the left hand side of Fig. 1), the movement of the said wind-wheel being transmitted through suitable gearing to a gear 30 wheel 30, adapted to roll along the circumference of a central stationary gear wheel 31, by which the shaft 6 with the motor wheel is caused to swing about the axis of the central vertical shaft 32. Instead of a wind-wheel a suitable helm may be used for the same purpose.

I claim:

1. In a wind motor the combination of a motor wind-wheel having adjustable blades, a speed governor driven by the motor, a controlling wind-wheel having adjustable blades, connections between the speed governor and the adjustable blades of the controlling wind-wheel for adjusting the positions of the said blades, and connections between the controlling wind-wheel and the adjustable blades of the motor wheel for adjusting the said latter blades, substantially as and for the purpose set forth.

2. In a wind motor the combination of a motor wind-wheel having adjustable blades, a speed governor driven by the motor, a controlling wind-wheel having adjustable blades, said latter wind-wheel being placed in front of the motor wind-wheel, connections between the speed governor and the adjustable blades of the controlling wind-wheel for adjusting the positions of the said blades for running in either direction, and connections between the controlling wind-wheel and the adjustable blades of the motor wind-wheel for adjusting the angles of the said latter blades in relation to the direction of the wind, substantially as and for the purpose set forth.

3. In a wind motor the combination of a motor wind-wheel having adjustable blades, a speed governor driven by the said wind-wheel, a controlling wind-wheel having blades attached to radial axles adapted to be turned in bearings, said latter wind-wheel being placed in front of the motor wind-wheel, connections between the speed governor and the blades of the controlling wind-wheel for adjusting the position of the said blades for running in either direction, and connections between the controlling wind-wheel and the adjustable blades of the motor wind-wheel for adjusting the angles of the said latter blades in relation to the direction of the wind, substantially as and for the purpose set forth.

4. In a wind motor the combination of a motor wind-wheel having adjustable blades, a speed governor driven by the motor, a controlling wind-wheel having adjustable blades, connections between the speed governor and the adjustable blades of the controlling wind-wheel for adjusting the positions of the said blades, connections between the controlling wind-wheel and the adjustable blades of the motor wind-wheel for adjusting the said latter blades, and means for adjusting the blades of the controlling wind-wheel by hand, substantially as and for the purpose set forth.

5. In a wind motor the combination of a motor wind-wheel having adjustable blades, a speed governor driven by the motor, a speed-controlling wind-wheel having adjustable, spring-actuated blades, connections between the speed governor and the adjustable blades of the controlling wind-wheel for adjusting the positions of the said blades against the spring-action thereon, and connections between the controlling wind-wheel and the adjustable blades of the motor wheel for adjusting the said latter blades, substantially as and for the purpose set forth 6. In a wind motor the combination of a motor wind-wheel, arcs pivotally mounted in the said wind-wheel, blades attached to the said arcs, a speed governor driven by the said wind-wheel, a controlling wind-wheel having adjustable blades, connections between the speed governor and the adjustable blades of the controlling wind-wheel for adjusting the positions of the said blades for running in either direction, a worm connected to the controlling wind-wheel, a worm-wheel engaging the said worm, pulleys connected to the said worm-wheel, and connections between the said pulleys and the arcs of the motor wind-wheel for adjusting the positions of the blades carried by the said arcs at an angle to direction of the wind corresponding to the speed of the motor wind-wheel.

7. In a wind motor the combination of a wind-wheel frame, arcs sunk into and pivotally mounted in the said frame, blades attached to the said arcs, a speed governor driven by the said wind-wheel, a controlling wind-wheel having adjustable blades, connections between the speed governor and the adjustable blades of the controlling wind-wheel for adjusting the positions of the said blades for running in either direction, a worm connected to the controlling wind-wheel, a worm-wheel engaging the said worm, pulleys connected to the said worm-wheel, and connections between the said pulleys and the arcs of the motor wind-wheel for adjusting the positions of the blades carried by the said arcs at an angle to the direction of the wind corresponding to the speed of the motor wind-wheel.

8. In a wind motor the combination of a motor wind-wheel having adjustable blades, a speed governor driven by the motor, a controlling wind-wheel having blades attached to adjustable axles, a spring-actuated rod movable in its longitudinal direction, said rod being connected at one end to the speed governor and at its other end to the adjustable blades of the controlling wind-wheel, and connections between the controlling wind-wheel and the adjustable blades of the motor wheel for adjusting the said latter blades, substantially as and for the purpose set forth.

CARL EDVIN NERÉN.

Witnesses:
KARL RUNESKOG,
AUG. SÖRENSEN.